USA Patent [19]

Hayashi

[11] Patent Number: 4,991,448
[45] Date of Patent: Feb. 12, 1991

[54] FUNCTION CHECKING SYSTEM FOR MAGNETIC TAPE CASSETTE
[75] Inventor: Youichi Hayashi, Kanagawa, Japan
[73] Assignee: Fuji Photo Film Co., Ltd., Kanagawa, Japan
[21] Appl. No.: 363,578
[22] Filed: Jun. 7, 1989
[30] Foreign Application Priority Data
  Jun. 8, 1988 [JP] Japan .................. 63-140810
[51] Int. Cl.⁵ .................. G01L 5/00; G01L 5/28
[52] U.S. Cl. .................. 73/862.52; 73/161; 73/862.01
[58] Field of Search ............. 73/161, 862.01, 862.52, 73/862.53, 862.62, 862.64
[56] References Cited
  U.S. PATENT DOCUMENTS
  4,455,879 6/1984 Hakoi et al. .................. 73/862.01
  FOREIGN PATENT DOCUMENTS
  0007072 1/1978 Japan .................. 73/862.52
  0752148 7/1980 U.S.S.R. .................. 73/862.53

Primary Examiner—Charles A. Ruehl
Attorney, Agent, or Firm—Sughrue, Mion, Zinn, Macpeak & Seas

[57] ABSTRACT

A tape cassette has a reel provided with a flange the outer periphery of which is toothed so that top lands and bottom lands are alternately formed. A brake mechanism includes a brake lever which can be swung between an engaging position in which its engaging portion abuts against one of the bottom lands and a retracted position in which the engaging portion is away from the teeth, and an urging spring which urges the brake lever toward the engaging position. A checking system which checks whether the brake mechanism can function correctly includes an instrument body which is movable in a first direction toward an operative position, an abutment member which is supported on the instrument body so that it can be swung relative to the instrument body in a second direction opposite to the first direction and abuts against the brake lever while the instrument body is moving toward the operative position, a balancer which impart light load to the abutment member in the first direction so that the abutment member urges the brake lever toward the retracted position under the light load against the force of the urging spring, a spring which imparts heavy load to the abutment member in the first direction when the abutment member is displaced under the counterforce of the brake lever by a predetermined amount relative to the instrument body in a second direction.

10 Claims, 5 Drawing Sheets

FUNCTION CHECKING SYSTEM FOR MAGNETIC TAPE CASSETTE

BACKGROUND OF THE INVENTION

1. Field of the Invention

This invention relates a function checking system which checks the reel braking function of a magnetic tape cassette.

2. Description of the Prior Art

Generally, a magnetic tape cassette such as a video cassette is provided with a brake mechanism which prevents rotation of the reels when the cassette is not in operation so that the magnetic tape wound around the reels does not unwind from the reels. That is, the outer periphery of the reel is toothed so that top lands and bottom lands are alternately formed, and a brake lever is provided so that it can be swung between an engaging position in which it abuts against one of the bottom lands and engages with a flank of one of the teeth on opposite sides of the bottom land so as to prevent rotation of the reel, and a retracted position in which it is away from the teeth and permits rotation of the reel. The brake lever is urged toward the engaging position under the force of a spring. When the cassette is loaded into a recording and reproducing system, the brake lever is swung to the retracted position overcoming the force of the spring by a suitable means such as a pin provided in the recording and reproducing system.

In the assembling step of the cassette, it is checked whether the brake mechanism will correctly function. Conventionally this check has been accomplished by a visual inspection of an operator, and accordingly, the checking efficiency and the checking accuracy have been unsatisfactory. There have been made various attempts to automate the check. In one attempt, the brake lever is swung overcoming the force of the spring by, for instance, a pusher pin and the load on the pusher pin (counterforce of the brake lever) is detected. Whether the brake mechanism will correctly function is determined on the basis of the comparison of the detected counterforce of the brake lever with a preset value.

More particularly, the pusher pin swings the brake lever under the force of a spring, and the counterforce of the brake lever is determined in terms of the displacement of the pusher pin at the time when the force of the spring urging the pusher pin comes to balance with the force of the spring urging the brake lever. When the displacement is between an upper limit value and a lower limit value, it is determined that the brake mechanism will correctly function. Depending on the type of the cassette, the width between the upper limit value and the lower limit value is very large, and the upper limit value can be six times as large as the lower limit value as shown in FIG. 7. For instance, in one type of cassette, the force of the brake lever urging spring may be between about 10 g and 70 g. Accordingly, if the displacement of the pusher pin is detected by a single detecting means, the error in detection becomes too large and, therefore, each of the upper and lower limit values must be detected by an exclusive detecting means, which add to the cost of the function checking system.

Further, there is a problem of error in detection due to the following interference. Since each of the bottom lands on the outer periphery of the reel has a width in the peripheral direction of the reel, the engaging portion of the brake lever can be moved in the peripheral direction of the reel within the bottom land. Accordingly, depending on the position of the engaging portion within the bottom land at the time the check is effected, the engaging portion can interfere with the corner of the top land adjacent to the bottom land. When the engaging portion is engaged with the corner of the top land, the load which acts on the pusher pin cannot be correctly detected.

Further, since the movable parts in the cassette including the brake lever are generally molded resin articles, the movement of the brake lever can be adversely affected by fin, dust or the like the first time. This can lead to misjudgement that a normal brake mechanism is mistaken for an abnormal brake mechanism.

Though the problems described above may be overcome by use of a stronger spring for urging the pusher pin, this make it more difficult to detect the counterforce of the brake lever which is close to the lower limit value.

Further, use of a load measuring instrument such as a strain gauge instead of the checking system described above leads to a significant increase in cost (e.g., more than ten times).

SUMMARY OF THE INVENTION

In view of the foregoing observations and description, the primary object of the present invention is to provide a function checking system which can check the reel braking function of a magnetic tape cassette with an improved accuracy at low cost.

In accordance with the present invention, light load is imparted to a member such as a pusher pin for swinging the brake lever overcoming the force of the spring when the counterforce which acts on the member is relatively small and heavy load is imparted to the same when the counterforce is relatively large. More particularly, in accordance with the present invention, there is provided a function checking system which checks the reel braking function of a magnetic tape cassette comprising a reel around which a magnetic tape is wound and which has a flange, the outer periphery of the flange being toothed so that top lands and bottom lands are alternately formed, and a brake mechanism including a brake lever which can be swung between an engaging position in which its engaging portion abuts against one of the bottom lands and a retracted position in which the engaging portion is away from the teeth, and a brake lever urging spring which urges the brake lever toward the engaging position, the checking system comprising an instrument body which is movable toward its operative position, an abutment member which is supported on the instrument body so that it can be swung relative to the instrument body in the direction opposite to the direction of the movement of the instrument body toward the operative position and operatively abuts against the brake lever while the instrument body is moving toward the operative position, a first loading means which impart light load to the abutment member in the direction of the movement of the instrument body toward the operative position so that the abutment member urges the brake lever toward the retracted position under the light load against the force of the brake lever urging spring when the abutment member is operatively brought into abutment against the brake lever, a second loading means which imparts heavy load to the abutment member in the direction of the movement of the instrument body toward the operative position when the abutment member is displaced under the counterforce of the brake lever by a predetermined amount relative to the instrument body in the direction opposite to the direction of the movement of the instrument body toward the operative position, and a position detecting means which detects the position of the abutment member.

While the instrument body is moving to the operative position, the abutment member is brought into abutment against the brake lever. If the counterforce of the brake lever is abnormally small, that is, when the counterforce of the brake lever is smaller than the light load imparted to the abutment member by the first loading means, the abutment member continues to move together with the instrument body still after it is brought into abutment against the brake lever. When the counterforce of the brake lever is not smaller than the light load, the abutment member is swung relative to the instrument body in the direction opposite to the movement of the instrument body. When the displacement of the abutment member reaches a predetermined value, the second loading means begins to impart the heavy load to the abutment member.

Accordingly, when the counterforce of the brake lever is between the light load and the heavy load, which is the case when the brake mechanism is normal, the abutment member is in the position where its displacement is the predetermined value, when the instrument body has reached the operative position. Accordingly, when the values of the light load and the heavy load are properly selected, whether the brake mechanism is normal can be known by detecting whether the abutment member is in or near the relevant position.

DESCRIPTION OF THE PREFERRED EMBODIMENT

Figure 1:
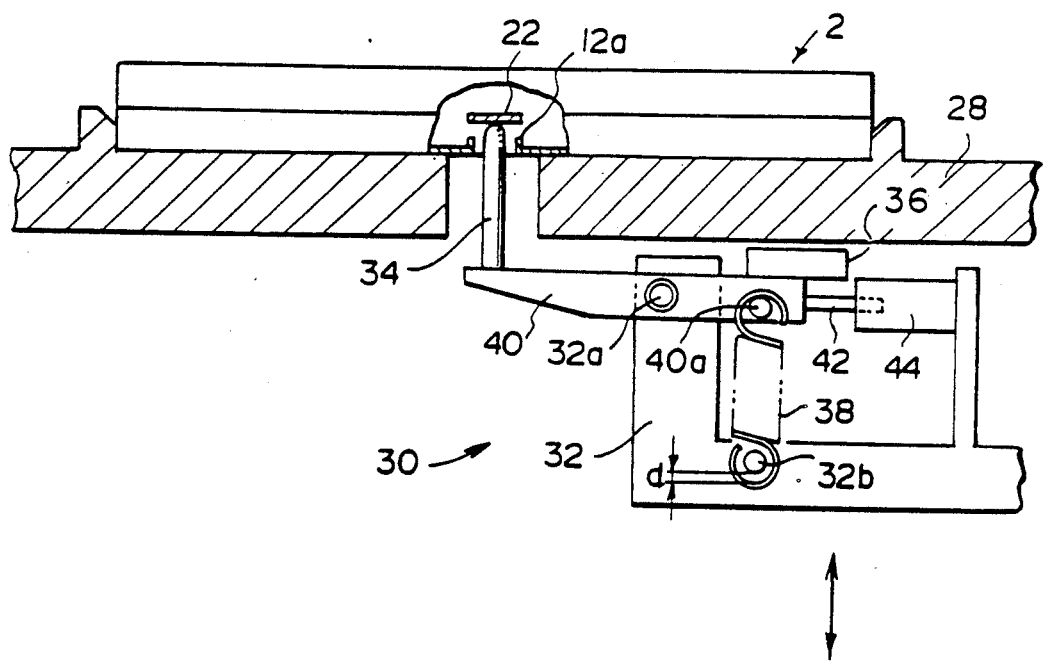
FIG. 1 is a side view showing a function checking system in accordance with an embodiment of the present invention.
Figure 3:
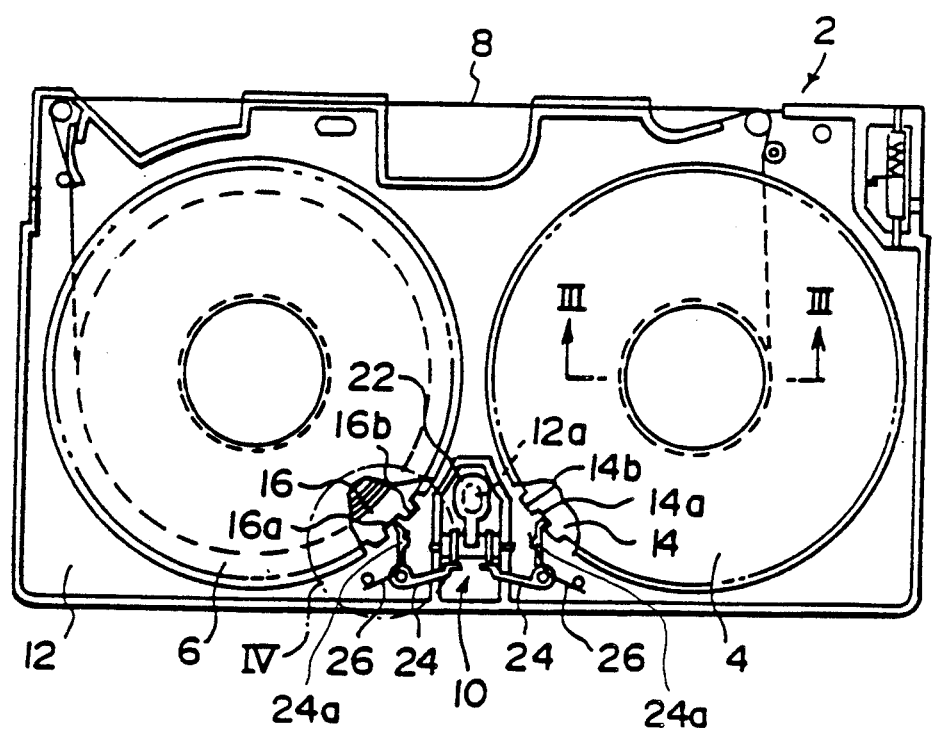
FIG. 3 is a plan view showing a video cassette.

The function checking system 30 shown in FIG. 1 checks the reel braking function of the video cassette 2 shown in FIG. 3.

As shown in FIG. 3, the video cassette 2 comprises a take-up reel 4, a supply reel 6, a magnetic tape 8 and a brake mechanism 10 which are accommodated in a casing 12. Each of the reels 4 and 6 has lower and upper flanges. The outer peripheral surface of the lower flange 14 of the take-up reel 4 is toothed so that bottom lands 14a and top lands 14b are alternately formed in the peripheral direction of the lower flange 14. Similarly, the outer peripheral surface of the lower flange 16 of the supply reel 6 is toothed so that bottom lands 16a and top lands 16b are alternately formed in the peripheral direction of the lower flange 16. The magnetic tape 8 is wound around the reels 4 and 6 at opposite end portions and runs along a predetermined path in the casing 12 at the intermediate portion.

The brake mechanism 10 comprises a release lever 22, a pair of brake levers 24 and a pair of brake lever urging springs 26. The release lever 22 is an L-shaped member which is mounted on the bottom of the casing 12 to be rotatable about an axis parallel to the bottom of the casing 12. The release lever 22 is swung upward by a pusher pin (to be described later) which is projected upward through an opening 12a formed in the bottom of the casing 12. Each of the brake levers 24 is an L-shaped member which is mounted on the bottom of the casing 12 to be rotatable about an axis perpendicular to the bottom of the casing 12. One of the brake levers 24 is for the take-up reel 4 and is urged by one of the springs 26 toward an engaging position in which the engaging end portion 24a thereof abuts against one of the bottom lands 14a as shown in FIG. 3. The other is for supply reel 6 and is urged by the other spring 26 toward an engaging position in which the engaging end portion 24a thereof abuts against one of the bottom lands 16a. Each of the springs 26 is a coil spring which is fit on the rotational shaft of the corresponding brake lever 24 with one end connected to the brake lever 24 and the other end connected to a boss provided on the casing 12.

The brake levers 24 are normally held in the respective engaging positions where the engaging end portions 24a thereof respectively abut against the bottom lands 14a and 16a, and when the release pin 22 is swung upward by the pusher pin, the release pin 22 urges the brake levers 24 to swing radially outwardly respectively away from the bottom lands 14a and 16a toward respective retracted positions where the engaging portions 24a are away from the top lands 14b and 16b so as to permit rotation of the reels 4 and 6.

When the brake mechanism 10 has been correctly incorporated in the casing 12, the counterforce of the release lever, i.e., the counterforce of the brake levers, against the force acting on the release lever 22 is within a predetermined range. The system of this embodiment checks whether the brake mechanism 10 can correctly function by checking whether the counterforce of the brake levers is with the predetermined range. The brake mechanism 10 cannot function correctly, for instance, when one or two of the brake lever urging springs 26 have not been provided or when the release lever 22 has not been provided in a correct attitude.

As shown in FIG. 1, the function checking system 30 is positioned below a checking table 28 which holds the cassette 2 in a predetermined position, and comprises a checking instrument body 32, a pusher pin 34, a balancer 36 (as the first loading means) and a loading spring 38 (as the second loading means).

The checking instrument body 32 is movable up and down and when it checks the reel braking function of the cassettes, it is moved upward to the operative position shown in FIG. 1.

The pusher pin 34 is fixed to an end of a checking lever 40 and extends upward therefrom. The checking lever 40 is mounted on the instrument body 32 so that it can be swung about a pivot 32a. The pusher pin 34 is brought into abutment against the release lever 22 of the cassette 2 while the instrument body 32 is moving to the operative position.

The balancer 36 is a weight which weighs at a predetermined value and is fixed to the other end of the checking lever 40. The weight or the balancer 36 normally causes a clockwise (as seen in FIG. 1) moment to act on the checking lever 40. The clockwise moment of the checking lever 40 generated by the balancer 36 acts on the pusher pin 34 as light load. The weight and the position on the lever 40 of the balancer 36 are selected so that light load slightly smaller than the smallest permissible value of the counterforce of the brake levers 24 acts on the pusher pin 34. When the system is not in operation, the lever 40 rests on a stopper (not shown) not to rotate clockwisely under the gravity of the balancer 36.

One end of the loading spring 38 is connected to a pin 40a which is fixed to said the other end of the checking lever 40 and the other end of the spring 38 is connected to a pin 32b which is fixed to the instrument body 32 in such a manner that the loading spring 38 begins to tense when the distance between the pins 40a and 32b is enlarged by a predetermined distance d. When the checking lever 40 is counterclockwisely rotated under the downward load which acts on the checking lever through the pusher pin 34 and the distance between the pins 40a and 32b is enlarged by the distance d, the loading spring 38 exerts upward heavy load through the pusher pin 34. The heavy load is set so that it begins to act on the pusher pin 34 with a value equal to the downward load transmitted thereto through the pusher pin 34 (the counterforce of the brake levers) when the downward force reaches a predetermined value slightly smaller than the largest permissible value, and then increases with increase in the value of the downward counterforce at the same rate. These effects of the loading spring 38 can be obtained when the initial tension and the spring constant are properly selected.

Figure 2:
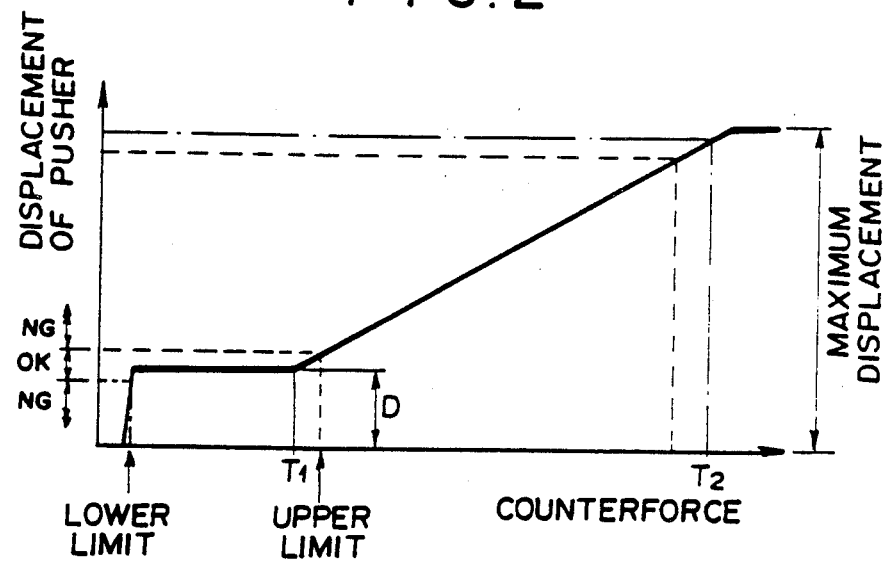
FIG. 2 is a graph for illustrating the operation of the function checking system shown in FIG. 1.

FIG. 2 shows the relation between the counterforce of the brake levers and the displacement of the pusher pin 34 relative to the instrument body 32. In FIG. 2, D represents the displacement of the pusher pin 34 when the checking lever 40 is rotated counterclockwisely by an amount corresponding to the predetermined distance d.

As shown in FIG. 1, a dog 42 is mounted on the end portion of the checking lever 40 opposite to the end portion on which the pusher pin 34 is mounted, and extends substantially in the horizontal direction. The instrument body 32 is provided with a photosensor 44 which detects the position of the dog 42. When the dog 42 is in or near the position corresponding to the position of the checking lever 40 in which the loading spring 38 begins to tense, that is, the position in which the displacement of the pusher pin 34 is D, the position detecting light beam (not shown) to be received by the photosensor 44 is interrupted by the dog 42 and the photosensor 44 outputs a position detecting signal.

The function checking system 30 of this embodiment checks the reel braking function of the video cassette 2 in the following manner.

First the instrument body 32 is lifted toward the operative position shown in FIG. 1. At this time, the pusher pin 34 is moved upward together with the instrument body 32 and is brought into engagement with the release lever 22 before the instrument body 32 reaches the operative position. Since the pusher pin 34 is under the light load which is given by the balancer 36 and is smaller the smallest permissible value of the counterforce of the brake levers 24, the checking lever 40 is rotated counterclockwisely with the upward movement of the instrument body 32 so long as the brake mechanism 10 has been correctly incorporated. On the other hand, when one or the both of the brake lever urging springs 26 has not been incorporated, for instance, the counterforce of the brake levers is too weak to rotate the checking lever 40 and the pusher pin 34 is moved upward while lifting the release lever 22. Accordingly, in this case, the dog 42 is held stationary and the photosensor 44 does not output the position detecting signal. Then it is determined that the brake mechanism 10 cannot function satisfactorily.

Further, if the counterforce of the brake levers is larger than the largest permissible value, the checking lever 40 is counterclockwisely rotated by a distance larger than the predetermined distance d. That is, since the largest permissible value of the counterforce is slightly larger than the initial tension of the loading spring 38, the spring 38 is extended by the counterforce. When the extension of the spring 38 exceeds the value corresponding to the largest permissible value, the rotation of the checking lever 40 becomes excessive and the dog 42 is displaced to a position in which it cannot interrupt the position detecting light beam. Also in this case, the photosensor 44 does not output the position detecting signal, and it is determined that the brake mechanism 10 cannot function satisfactorily.

Figure 4A:
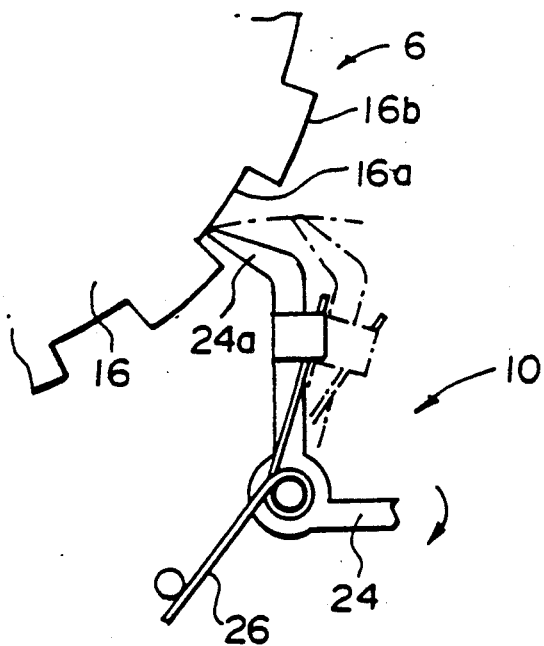
FIG. 4a is an enlarged fragmentary view showing a part of the cassette circumscribed with chained line IV in FIG. 3.
Figure 4B:
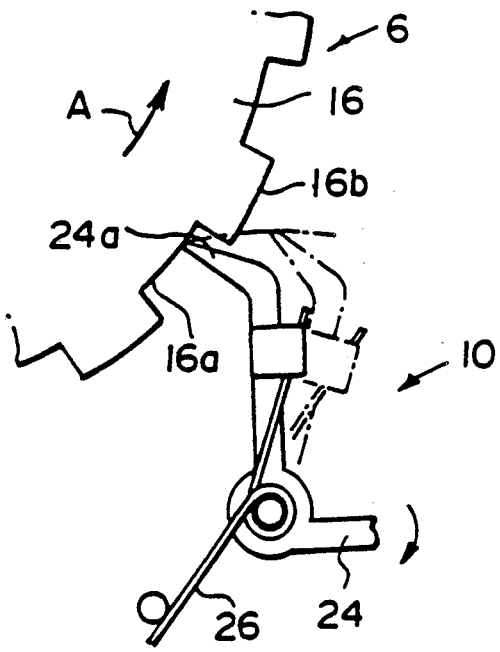
FIG. 4b is a view similar to FIG. 4a but showing the part in a different condition.

As shown in FIGS. 4a and 4b, the brake lever 24 can be moved relative to the reel in the peripheral direction thereof within the width of the bottom land (14a, 16a) even if the brake lever 24 is in the engaging position. Accordingly, depending on the position of the engaging portion 24a in the bottom land, the engaging portion 24a can interfere with the top land (14b, 16b) adjacent to the bottom land and the counterforce of the brake levers 24 can temporarily become larger than the inherent counterforce which is due to the force of the loading springs 38. Further, the counterforce of the brake levers 24 can temporarily become larger than the inherent counterforce due to external turbulence such as short of intimacy among the casing 12, the release lever 22 and the brake levers 24. Such a temporary excessive counterforce can be overcome by the loading spring 38. That is, as shown in FIG. 2, the loading spring 38 first resists the counterforce with an initial tensing T1 and then the tension of the loading spring 38 increases to a tension T2 as the instrument body 32 is further moved upward and the counterforce is thereby increased. Then the tension of the loading spring 38 overcomes the counterforce so long as the counterforce is transitorily excessive, thereby removing the cause of the excessive counterforce, and the pusher pin 34 is returned to the position in which the displacement of the pusher pin 34 is D by the spring 34. When the pusher pin 34 is returned to the position in which the displacement of the pusher pin 34 is D, and the photosensor 44 outputs the position detecting signal, it is determined that the reel braking function of the cassette is normal. The term "maximum displacement" in FIG. 2 denotes the maximum displacement of the pusher pin 34 by which the pusher pin 34 can be displaced relative to the instrument body 32 when the instrument body 32 is in the operative position.

As can be understood from the description above, in the function checking system of this embodiment, the pusher pin 34 is first imparted with light load and with heavy load when the counterforce of the brake levers is too heavy for the light load to be matched against the counterforce. The light load is set for the smallest permissible value of the counterforce and the heavy load is set for the largest permissible value of the counterforce, and the heavy load is caused to act on the pusher pin 34 after the pusher pin 34 is displaced by a predetermined amount. Accordingly, whether the braking function is normal or abnormal can be determined on the basis of whether the pusher pin 34 is in or near the position corresponding to the displacement of the predetermined amount. Thus, in accordance with this embodiment, the reel braking function check can be performed easily with high accuracy. As compared with the conventional system, the accuracy in detection of the counterforce of the brake lever which is close to the smallest permissible value is particularly improved. Further, the counterforce ranging from that close to the smallest permissible value to that close to the largest permissible value can be detected by a single photosensor. Further, by virtue of the heavy load exerted by the loading spring 38, external turbulences such as an interference of the brake levers 24 and the reels 4 and 6 can be removed, and accordingly, it can be detected with a high accuracy whether the mechanism for applying and releasing the brake levers will correctly function.

Figure 5:
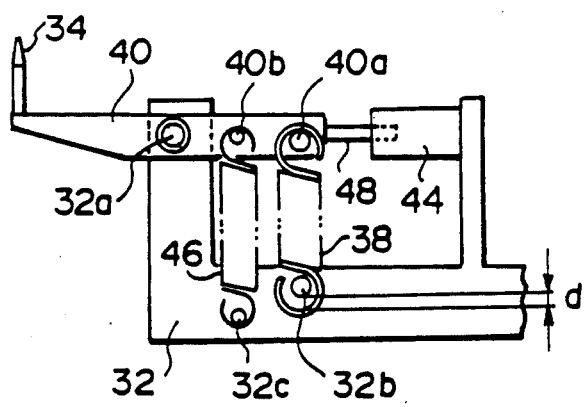
FIG. 5 is a side view showing a function checking system in accordance with another embodiment of the present invention.
Figure 6:
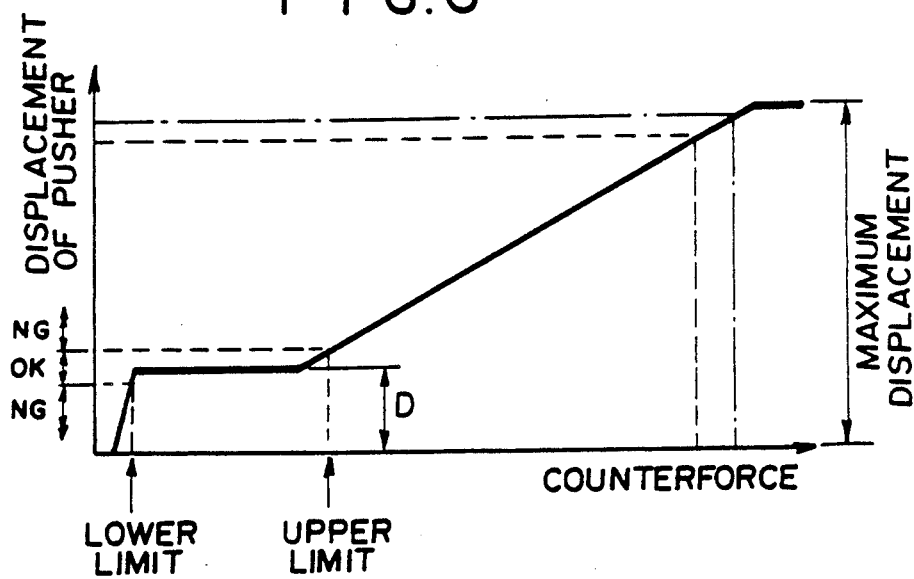
FIG. 6 is a graph for illustrating the operation of the function checking system shown in FIG. 6.
Figure 7:
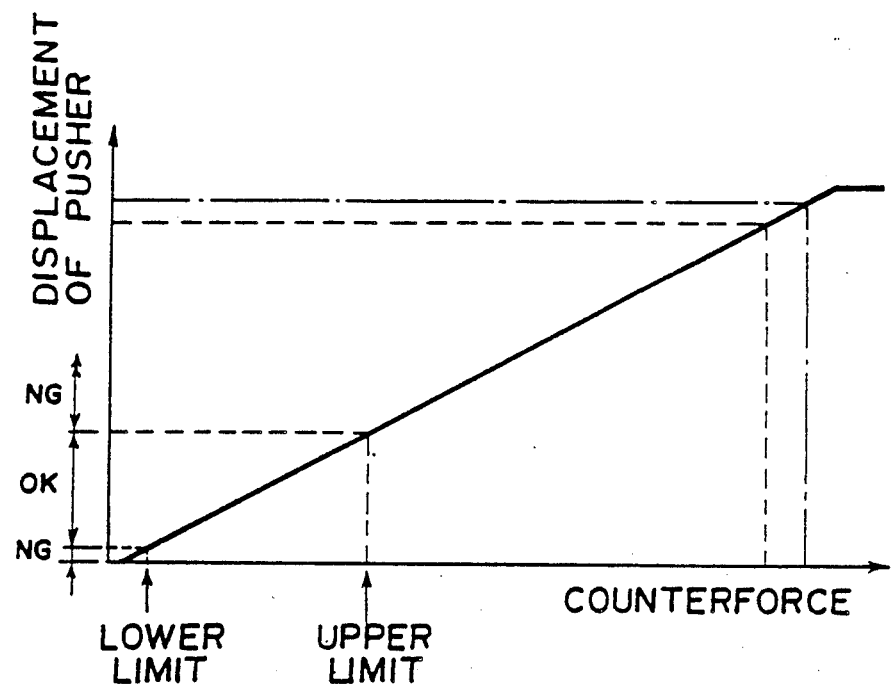
FIG. 7 is a graph similar to FIG. 2 but for the case of the conventional system.

Instead of the balancer 36, a spring 46 as shown in FIG. 5 may be employed in order to generate the light load. The upper end of the spring 46 is connected to a pin 40b fixed to the lever 40 and the lower end of the spring 46 is connected to a pin 32c. The initial tension of the spring 46 is slightly smaller than the smallest permissible value of the brake levers, and when a tension load heavier than the initial tension is exerted on the spring 46, the spring 46 is extended. When the extension of the spring 46 reaches a predetermined length d, that is, when the displacement of the pusher pin 34 reaches the value D, the spring 46 produces a spring force which is slightly larger than the smallest permissible counterforce.

Also in this embodiment, substantially the same effect can be obtained.

What is claimed is:

1. A cassette brake function checking system which checks the reel braking function of a magnetic tape cassette comprising a reel around which a magnetic tape is wound and which has a flange, the outer periphery of the flange being toothed so that top lands and bottom lands are alternately formed, and a brake mechanism including a brake lever which can be swung between an engaging position in which its engaging portion abuts against one of the bottom lands and a retracted position in which the engaging portion is away from the teeth, and a brake lever urging spring which urges the brake lever toward the engaging position, the checking system comprising:

brake instrument means for moving toward operative brake checking positions,
   abutment member means which is supported on said brake instrument means so that said abutment member means can be swung relative to said brake instrument means in a direction opposite to a direction of movement of said brake instrument means toward said brake checking positions, said abutment member means for being operatively brought into abutment contact against the brake lever as said brake instrument means is moved toward said brake checking positions,
   first loading means for imparting a light load to said abutment member means in the direction of movement of said brake instrument means toward said brake checking positions so that said abutment member means urges the brake lever toward the retracted position under the light load against the force of the brake lever urging spring when said abutment member means is operatively brought into abutment contact against the brake lever,
   second loading means for imparting a heavy load to said abutment member means in the direction of movement of said brake instrument means toward said brake checking positions when said abutment member means is displaced under a counterforce of the brake lever by a predetermined amount relative to said brake instrument means in the direction opposite to the direction of movement of said brake instrument means toward said brake checking positions, and
   position detecting means for detecting a position of the abutment member means.

2. A cassette brake function checking system comprising:

tape cassette means including brake surface means for use in braking a movement of a tape, and brake lever means being normally biased into engagement with said brake surface means for braking a movement of said tape, said brake lever means being biased into said engagement at a predetermined minimum biasing force and being able to be disengaged with said brake surface using a force equal to or less than a predetermined disengaging force;
   brake instrument means for moving toward operative brake checking positions, and including abutment member means supported on said brake instrument means for abutting against said brake lever means and being movable relative to said brake instrument means as a result of resistance counterforce from said brake lever means as said brake instrument means is moved toward said operative brake checking positions;
   bias checking means for biasing, at a force less than said predetermined minimum biasing force, said abutment member means into a predetermined first position relative to said brake instrument means, and for checking, at a time when said brake instrument means has been moved to a first operative brake checking position relative to said tape cassette means, whether said abutment member means has moved from said first position to a predetermined second position relative to said brake instrument means thus to indicate a valid minimum biasing force of said brake lever means; and
   disengage checking means for biasing, at a force substantially equal to said predetermined disengaging force, said abutment member means at said predetermined second position relative to said brake instrument means, and for checking, at a time when said brake instrument means has been moved to a second operative brake checking position relative to said tape cassette means, whether said abutment member means remains at said second position relative to said brake instrument means thus to indicate valid disengagement of said brake lever means using a force equal to or less than said predetermined disengaging force.

3. A system as claimed in claim 2, wherein said bias checking means biases said abutment member means into said predetermined first position using weight means attached to said abutment member means.

4. A system as claimed in claim 3, wherein said disengage checking means biases said abutment member means at said predetermined second position using spring means attached between said abutment member means and said brake instrument means.

5. A system as claimed in claim 4, wherein said predetermined disengaging force is greater than said predetermined minimum bias force.

6. A system as claimed in claim 5, wherein said tape cassette means is a magnetic tape cassette.

7. A system as claimed in claim 6, wherein said magnetic tape cassette comprises a reel around which a magnetic tape is wound and which has a flange, the outer periphery of the flange which is toothed so that top lands and bottom lands are alternately formed representing said brake surface means, and wherein said brake lever means can be swung between and engaging position in which an engaging portion abuts against one of the bottom lands and a retracted position in which the engaging portion is clear of said bottom and top lands.

8. A system as claimed in claim 7, wherein said bias checking means and disengage checking means comprise photocell means for said checking of a position of said abutment member means relative to said brake instrument means.

9. A system as claimed in claim 2, wherein said bias checking means biases said abutment member means into said predetermined first position using spring means attached between said abutment member means and said brake instrument means.

10. A system as claimed in claim 9, wherein said disengage checking means biases said abutment member means at said predetermined second position using spring means attached between said abutment member means and said brake instrument means.

* * * * *